Sept. 6, 1932.   A. H. SHOEMAKER   1,875,893
PNEUMATIC TIRE AND RIM CONSTRUCTION
Original Filed Nov. 19, 1925
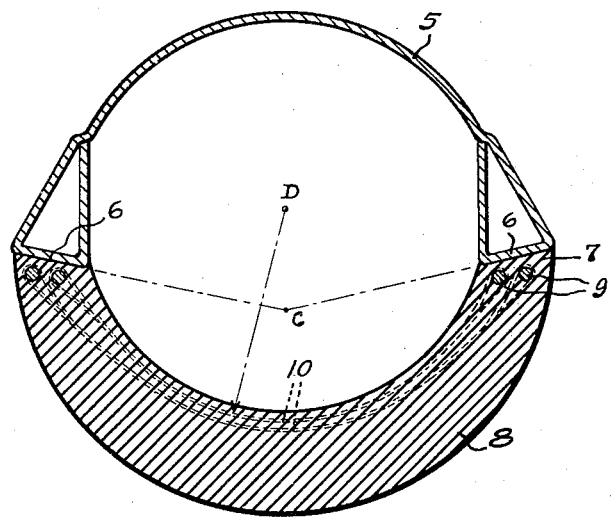
Fig. 1
Fig. 3
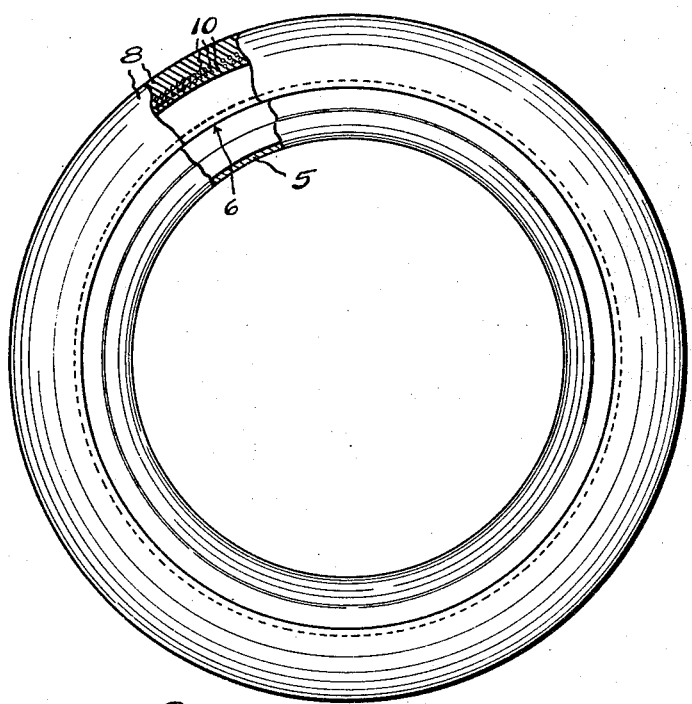
Fig. 2
INVENTOR
Alvin H. Shoemaker
BY
Fred C. Matheny
ATTORNEY Patented Sept. 6, 1932

1,875,893

UNITED STATES PATENT OFFICE

ALVIN H. SHOEMAKER, OF SEATTLE, WASHINGTON

PNEUMATIC TIRE AND RIM CONSTRUCTION

Original application filed November 19, 1925, Serial No. 69,995. Divided and this application filed March 19, 1930. Serial No. 436,920.

My invention relates to improvements in pneumatic tire and rim constructions of the form in which a tire which does not exceed a semi-circle in cross sectional shape is used on a peripherally grooved rim, and wherein substantially one half of the air from which the tire derives its resiliency is contained within the recessed rim and the other half within the tire.

My present application is a division of my prior application Serial Number 69,995, filed November 19, 1925, and is further in the nature of an improvement on my prior Patent Number 1,510,709, issued October 7, 1924 and re-issued as Patent Number 17,461 on October 15, 1929.

A more specific object of my invention is to provide a tire and rim construction embodying a rim having an annular circumferential cavity forming an air chamber, and having an inclined conical bead receiving portion free from abrupt shoulders extending around said cavity on each side of the rim, said bead receiving portions being of larger diameter at their inner edges and of smaller diameter at their outer edges and being arranged to receive the inclined bead portions of the tire, whereby said tire bead portions will be caused to draw inwardly when inflated and to bind circumferentially on said inclined bead receiving rim portions.

Further objects are to provide a tire which is cheap to construct, due to the fact that it requires less rubber and less binder than the ordinary pneumatic tire of corresponding size; to provide a tire which may be very quickly and very easily demounted and which is not liable to become rim cut or to be seriously damaged in case of puncture; to provide a tire which is light in weight and is especially resilient and easy riding when inflated to relatively high pressure; and to provide a tire which will effect a saving in the power required to propel a vehicle over and above that required with the usual balloon type of tires of corresponding size and resilient qualities. Also to provide a shallow tire especially suited for large sizes where the depth of full sized tires is ordinarily greater than is needed.

Other and more specific objects will be apparent from the following description taken in connection with the accompanying drawing.

In the drawing Figure 1 is a cross sectional view of a tire and rim constructed in accordance with my invention.

Fig. 2 is a view in elevation, on a reduced scale, of the same, parts being broken away.

Fig. 3 is a detached edge view of the rim.

Like reference numerals designate like parts throughout the several views.

Referring to Figs. 1, 2, and 3, the numeral 5 designates a circular rim which is adapted to be secured, in any suitable manner, to a wheel, not shown. The rim 5 is substantially semi-circular in cross section and the edges of said rim are bent as shown to afford conical bead receiving surfaces 6, which are inclined relative to any plane tangential to the rim and are adapted to have the bead portions 7 of a tire 8 seat thereon.

The tire 8 may be of various forms of construction but I prefer to provide in each tire head 7 two non-elastic bead rings 9 which constitute the only binder running lengthwise around the tire and to reinforce the tire with cords 10 which run crosswise or near enough crosswise between the rings of the two beads 7 to form a transverse binder but leave the tire free to expand longitudinally except for the bead rings. The bead rings are non-elastic, as for instance, said bead rings may be continuous hoops of steel that will not stretch when drawn tightly onto the conical bead receiving surfaces 6 of the rim, but will bind circumferentially on said rim.

The tire 8 is without the usual side walls and is similar to the tread portion of an ordinary pneumatic tire which has its side walls removed and the non-elastic bead rings incorporated therein.

The bead receiving portions 6 are inclined from the inner portion of the rim outwardly so that their planes prolonged will intersect each other at the point "C" outside of the recessed portion of the rim and so that the bead portions of the tire 8 will be drawn from the outside inwardly and up the slope of said bead receiving portions and will be caused to tighten circumferentially on said bead receiving portions 6.

The tire 8 is less than a semi-circle in cross section and is bound crosswise by the radial cord reinforcing but is free to expand longitudinally except for the bead rings. The result of this construction is that when the tire 8 is placed on the rim it will be drawn across the rim on an arc of less than a half circle and the cords 10 will assume an arc whose center D is located beyond the plane passing through the bead portions 7 so that when said tire is subjected to internal air pressure the cords held by the non-elastic bead rings will tend to be drawn into the form of a smaller arc and will draw the bead portions 7 of said tire inwardly tightly onto the inclined bead receiving rim portions 6.

If the angle of the bead receiving portions 6 and bead portions 7 is too great, the bead portions 7 will not tighten circumferentially on the bead receiving portions 6 and may tend to slide outwardly down the incline when in use, thus destroying the practicability of the device. In a similar way any shoulder or obstruction of any substantial size on the rim against which the bead portion of the tire may abut will retard the tightening of the bead portions 7 circumferentially on the rim. This circumferential tightening is essential in this type of tire and rim to insure the necessary frictional binding of the tire on the rim for traction and driving purposes.

The angles of the inclined bead receiving portions 6 may be varied within certain limits, but, in order to secure satisfactory results these angles must not be too great. In practice I have obtained very satisfactory results by forming the bead receiving portions 6 at an angle of substantially twelve and one half degrees relative to any plane tangential to the peripheral extremities of the rim, as exemplified by the dotted line P—P, in Fig. 3. Obviously this angle may be varied within reasonable limits in either direction.

In my copending application Serial Number 69,995, of which this application is a division, I have shown a tire and rim construction in which the tire is equal to or greater than a half circle in cross section and in which the direction of incline of the bead receiving portions of the rim is reversed and the bead portions of the tire are adapted to be forced outwardly instead of being drawn inwardly by internal air pressure. I find that where the tire is greater than a half circle when seated on the rim, the bead portions of the tire will be forced outwardly by air pressure but where the tire is less than a half circle when seated on the rim the internal air pressure will draw the beads inwardly. At approximately a semi-circular shape of the tire there will be very little tendency for internal air pressure to move the beads in either direction.

The foregoing description and accompanying drawing clearly disclose a preferred embodiment of my invention, but it will be understood that this disclosure is merely illustrative, and that such changes in the invention may be made as are fairly within the scope and spirit of the following claims.

I claim:

1. In a tire and rim construction of the class described, a rim having an annular circumferential air cavity forming an air chamber, conical bead receiving portions formed on the edges of said rim at an incline to a plane tangential to said rim, the inner edges of said bead receiving portions being slightly higher than the outer edges of the same, and a half tire of elastic material having non-elastic bead portions arranged to be drawn inwardly onto said bead receiving portions by air pressure within said tire and to bind circumferentially on said inclined bead receiving portions, said bead portions each having two non-elastic bead rings therein, said bead rings being spaced apart and arranged to rest squarely on said inclined bead receiving rim portions whereby rocking movement of said tire bead portions on said inclined rim portions is prevented and an efficient air seal insured, said half tire having reinforcing means extending between said two bead portions and forming a substantially non-elastic transverse binder but leaving said tire free to expand longitudinally except for said bead portions.

2. In a tire and rim construction of the class described, a rim having an annular circumferential cavity forming an air chamber, inclined conical bead receiving portions provided on the edges of said rim, the inner edges of said bead receiving portions being slightly higher than the outer edges of the same, and a tire of a cross sectional shape substantially equal to but less than a semi-circle and having spaced apart non-elastic conical bead portions arranged to be drawn inwardly onto said inclined bead receiving rim portions by pressure of air within said tire, said tire bead portions each having a plurality of non-elastic bead rings therein, said bead portions binding circumferentially on said bead receiving rim portions to form an air tight connection, said plurality of nonelastic bead rings resting squarely on said inclined bead receiving rim portions whereby rocking movement of said tire bead portions on said inclined rim portions is prevented.

3. In a pneumatic tire and rim construction, a rim, spaced apart conical bead receiving portions at the sides of said rim, the inner edges of said bead receiving portions being higher than the outer edges of the same to give said bead receiving portions an angle of substantially twelve and one half degrees, and a tire having a cross sectional shape of less than a semicircle when seated on said rim, and having non-elastic bead portions each provided with an inclined conical base corresponding to the angle of said bead receiving rim portions, said tire bead portions each having a plurality of non-elastic spaced apart bead rings embedded therein and arranged to rest squarely on said inclined rim portions to thereby prevent rocking movement of said tire bead portions on said inclined rim portions, said bead portions being drawn inwardly onto said inclined bead receiving rim portions by air pressure within said tire and binding firmly circumferentially on said inclined bead receiving rim portions.

The foregoing specification signed at Seattle, Wash., this 13th day of Mar. 1930.

ALVIN H. SHOEMAKER.